Dec. 29, 1964     A. ZEISMER     3,163,472

MATERIAL SEPARATOR MECHANISM

Filed Oct. 23, 1961

ARTHUR ZEISMER
INVENTOR
HUEBNER & WORREL
ATTORNEYS
BY *Richard M. Worrel*

United States Patent Office

> 3,163,472
> Patented Dec. 29, 1964

3,163,472
MATERIAL SEPARATOR MECHANISM
Arthur Zeismer, 630 N. Irwin, Hanford, Calif.
Filed Oct. 23, 1961, Ser. No. 146,885
5 Claims. (Cl. 302—59)

This invention relates to a material separator mechanism adapted for use in a conveying system which employs a moving fluid as a conveying vehicle for particles of low density fibrous material. It particularly relates to a separator adapted for use in filtering cotton entrained in a conveying stream of moving air which includes particles of foreign material smaller than and of a density different from that of the particles of cotton.

Certain types of machines adapted for harvesting cotton, such as cotton pickers and gleaners, employ a pneumatic conveying system in the machine to transport the cotton from a picking head to a receptacle carried on the machine. The air stream moving through such a pneumatic conveying system must be maintained at a velocity sufficient to transport the cotton in a horizontal direction as well as in a vertical direction, if it is to be elevated above the picking head. A commonly accepted conveying velocity employed in such conveying systems for cotton is two thousand feet per minute. With the air moving at such a velocity through the picking head, portions of cotton stalks, leaves, dirt, and other foreign material inevitably become entrained in the air stream. The presence of such foreign material complicates the problem of separating the cotton from the stream of transporting air when such stream is discharged into the receptacle.

Accordingly, the principal object of the present invention is to provide a separator mechanism which will efficiently separate cotton from a stream of moving air which is transporting the cotton.

Another object is to provide a separator for a pneumatic conveying system which effectively segregates particles entrained therein in accordance with particle size and density.

Another object is to provide a separator for a cotton conveying system using a high velocity air stream which will not become clogged by the cotton fibers and automatically cleanses itself during operation.

A further object is to provide a separator for a cotton conveying system which is simple in design, efficient in operation, and dependable in action.

These, together with other objects, will become more fully apparent upon reference to the following description and accompanying drawing.

Figure 1:
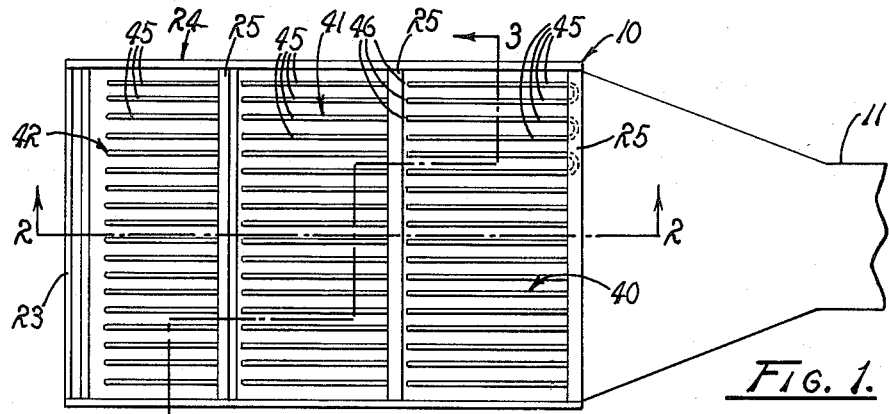
FIG. 1 is a top plan view showing a portion of a pneumatic cotton conveying system in communication with a receptacle provided with a separator mechanism embodying the principles of the present invention.

As illustrated in FIGURE 1, a receptacle 10 is in communication with a discharge duct 11 from which a stream of conveying fluid issues. The environment selected for conveniently describing the invention is that of a conventional cotton picker or gleaner which employs a pneumatic conveying system to transport particles of cotton from a picking head such as that shown in my copending patent application Serial No. 146,856, filed October 23, 1963, now United States Patent No. 3,144,742. In such an environment, a fluid stream 12 comprises a volume of moving air blown through a conveying system, a portion of which is shown as the discharge duct 11. The duct 11 is formed in such a manner to constrain the fluid stream in a generally horizontal direction, but somewhat inclined so that the stream has a predetermined vertical component. Entrained in the air stream and illustrated at 13 are cotton particles being conveyed to the receptacle 10. Also entrained in the air stream is a plurality of particles 14 of foreign material, such as broken bits of cotton stalks, leaves, dirt, and other trash.

The air, cotton, and the entrained foreign material constitute a moving fluid stream from which the cotton particles are to be separated in a selective manner. During such separation, it is desirable that a maximum portion of the total entrained foreign material also be excluded from the receptacle. It should be noted that the cotton particles are of a fibrous material having a relatively low density and that the mean diametrical proportions of the cotton particles are larger than the average maximum dimension of the entrained particles of foreign material.

The receptacle 10 is formed of a perforate lower section 20 and includes opposed side walls 21 and forward and rearward walls 22 and 23. The upper portion of the receptacle comprises an open framework 24 on which is mounted a separator mechanism. The separator mechanism includes a plurality of transverse support bars 25 which are spaced at predetermined intervals. The intervals of spacing of the bars longitudinally of the air stream is in direct proportion to the velocity of the stream at the zone in which the bar is disposed. Accordingly, the interval of spacing indicated at "A" is greater than the interval spacing "B," which is downstream from "A." Only three such transverse support bars are shown in FIGURE 1; if a greater number of bars were to be employed, the intervals of spacing downstream from "B" are proportioned in accordance with the velocity of the air stream at the respective locations of such additional bars.

The separator mechanism also includes a plurality of spaced rigid elongated members which are biased to a position normal to the direction of fluid flow and extended transversely of the stream of fluid. As shown in the drawing, such a plurality of elongated members are shown at 30, 31, and 32, and constitute first, second, and third groups of filters arranged in series relationship in the fluid stream. Each of the groups comprises a plurality of individual rods 33 pivotally mounted on their respective transverse support bar 25 and biased gravitationally to a position normal to the direction of fluid flow. The downstream group may be supported to swing in unison in the direction of air flow. The bars comprising each group are spaced transversely of the fluid stream at predetermined intervals. The intervals of spacing of the first, second and third groups are respectively designated "a," "b" and "c."

In actual practice, it has been found that satisfactory intervals of spacing designated as "a" are ones slightly greater than the mean diametrical proportions of the particles of cotton entrained in the air stream. This will prevent the first filter from becoming overloaded during operation. The intervals "a" are also greater than the intervals "b". The transverse intervals "b" should at least be equal to the main diemetrical dimension of the cotton particles, and the spacing intervals "c" should be less than such dimension but greater than the maximum dimensions of the particles of foreign material. For reasons of simplicity, such maximum dimensions will be referred to as mean diametrical dimension, regardless of the configuration of the particles, it being understood that many particles of cotton stalks are broken from their original cylindrical shape to such small proportions so as to be substantially spherical in shape for the purpose of employing the terminology "mean diametrical dimension."

Also mounted on the open framework is a series of fixed slotted-type deflectors 40, 41, and 42. Each deflector may be formed of transversely spaced, individual bars rigidly attached to one of the transverse support bars 25. In actual practice, each of the deflectors comprises a plurality of elongated bars 45, each being bent in the form of a U so that the ends 46 are spaced at a predetermined interval. The bight portion is joined to one of the support bars by any suitable means, as by welding. The interval of spacing between the ends of each U-shaped bar and the adjacent ends of contiguous bars should be substantially less than the minimum diametrical proportions of the particles of cotton. In actual practice, a spacing interval of three-sixteenths of an inch has been found to be satisfactory. This interval is less than the diametrical proportions of the cotton but greater than the mean diametrical dimension of the particles of foreign material. Accordingly, the particles of cotton are deflected from the conveying air stream, while the particles of foreign material are permitted to escape through the intervals of spacing.

Operation

Figure 2:
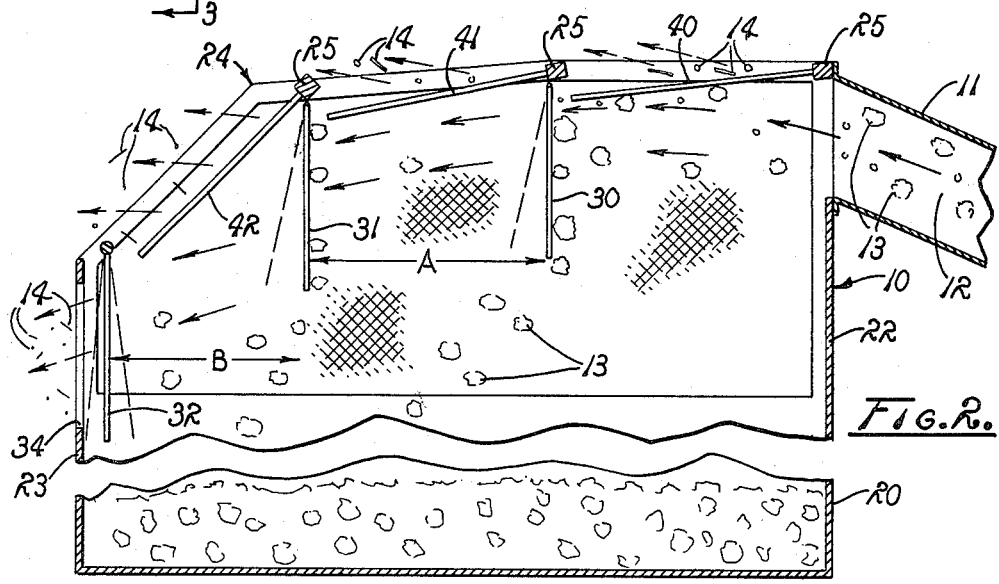
FIG. 2 is a vertical longitudinal section taken on line 2—2 of FIG. 1.
Figure 3:
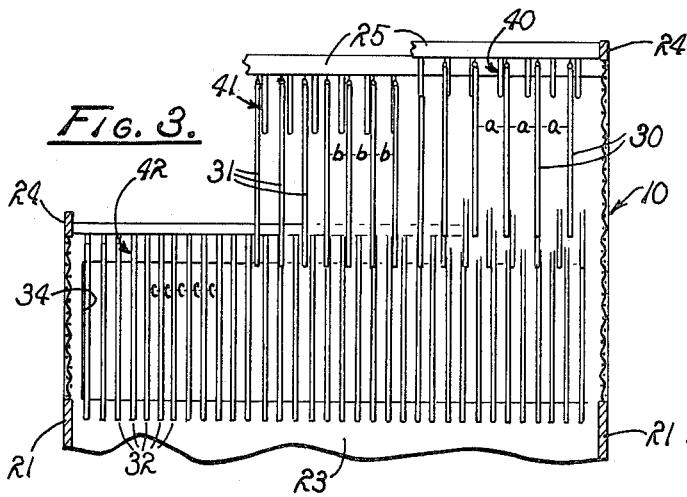
FIG. 3 is a transverse verticle section taken on line 3—3 of FIG. 1, with portions of the structure shown fragmentarily for illustrative convenience.
Figure 4:
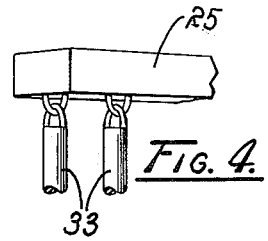
FIG. 4 is a fragmentary view in perspective of the universal mounting of the individual rods of the depending filters.

The operation of the described embodiment of the subject invention is believed to be readily apparent and is briefly summarized at this point. The velocity of the air stream moving through the duct 11 of the conveying system is approximately two-thousand feet per minute. Accordingly, the particles of cotton entrained in the air stream must be decelerated by the separator mechanism so that such particles may be deposited gravitationally within the receptacle 10. Since the air stream is flowing in a general horizontal direction with a slight vertical component, the total fluid stream of air and entrained particles initially contacts the first deflector 40 comprised of the spaced U-shaped bars 45. Since the interval of spacing is insufficient to permit the escape of any particles of cotton, they are carried further to the left as viewed in FIG. 2, by the force of the moving stream. The cotton particles are also directed somewhat downwardly by the inclined rods causing a certain amount of tumbling action. This action exposes the individual particles of foreign material to the moving air stream, whereby the particles of foreign material are permitted to escape through the intervals of spacing. As the stream of conveying air flows through the first group 30 of rods 33, a portion of the cotton particles is decelerated by the individual rods comprising the group. Cotton particles striking the rods directly are decelerated to a zero velocity but in many instances are still held against the individual rods by the force of moving air in a manner which temporarily precludes their settling gravitationally toward the bottom of the receptacle. As the accumulated mass of the particles increases to an extent exceeding the supporting force of the conveying stream, they gravitate downwardly from the air stream and collect in the bottom of the receptacle 10.

Frequently, such mass of cotton continues to accummulate against the rods 33 until it is a substantial impediment to the air stream, all the while being held against the rods by the air stream. As the air resistance to the accumulated mass increases, the force of the air gradually pivots the rods in the direction of air movement. Such pivoted positions are illustrated in dashed line in FIG. 2. Such pivoting action has two effects. First, the friction between the cotton mass and the rods is reduced because of the decreased angular relation between the rods and the air stream. Second, the plane of the rods in pivoting in the direction of air movement, disposes the cotton mass so that the thrust of the air has a component tending to strip the cotton from the rods for gravitational descent into the receptacle 10. Thus, in actual practice, the rods are found to discharge accumulated cotton quite readily upon even slight pivoting action. Further, the mounting of the rods for independent pivotal movement facilitates this cotton releasing action.

In like manner, the second 31 and third 32 groups of rods successively filter more of the cotton from the air stream as it progresses through the receptacle. Since the transverse spacing intervals "a", "b" and "c" are all greater than the mean diametrical proportion of foreign particles entrained in the air stream, the air stream is able to carry such particles through the series of groups for discharge through a suitable opening 34 provided in the rear wall 23.

As the filling operation continues, the receptacle 10 is emptied at required intervals, if the separating process is done as a batch process, or in connection with a self-propelled picker in the cotton field. If the separating is done as a continuous process, the lower portion of the receptacle may be provided with a continuously moving conveyor belt or other suitable device to remove the cotton separated from the air stream.

Accordingly, it can be seen that the invention provides a separator mechanism which is dependable in action and employs a minimum of component parts. The longitudinal spacing of the groups 30, 31, and 32 is determined by the initial velocity of the fluid stream issuing from the exhaust duct, whereas the transverse spacing "a", "b" and "c" is determined in accordance with the mean diametrical proportions of the particles of material to be separated, as well as the proportions of any particles of foreign material entrained in the conveying fluid stream. With both intervals proportioned in accordance with fluid stream velocity and particle size, the separator mechanism is effective to separate larger, less dense particles from the air stream, while ejecting smaller particles of varying densities from the rear of the receptacle.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for separating cotton or the like from an air stream comprising an air pervious receptacle having upper and lower portions, means for directing an air stream bearing cotton or the like substantially horizontally into the upper portion of the receptacle, and a plurality of groups of transversely spaced substantially straight rods having upper ends individually pivotally mounted in the upper portion of the housing for swinging movement longitudinally of the air stream and freely pendant lower ends, said rods being disposed when at rest in a substantially common plane normal to the air stream, said groups of such rods being arranged in spaced relation longitudinally of the air stream, the rods in successive groups longitudinally of the air stream being progressively more closely transversely spaced.

2. In combination with a pneumatic conveying system employing a stream of moving air as a transporting force to convey cotton particles of a predetermined mean diameter and particles of foreign material of a smaller size, both types of particles being entrained in the air stream, a separator mechanism selectively to divert the cotton particles from the air stream comprising a frame, a plurality of filters supported therein and disposed in series at spaced intervals in said stream, each of said filters having a transversely disposed support bar secured to the frame and a plurality of elongated members individually pivotally depending from said support bar and transversely spaced at predetermined intervals to permit passage therethrough of the particles of said foreign material while diverting downwardly the particles of cotton wherein the intervals of spacing of said filter members are progressively decreased in a downstream direction.

3. In combination with a pneumatic conveying system employing a stream of moving air as a transporting force to convey cotton particles of a predetermined mean diameter and particles of foreign material of a smaller size, both types of particles being entrained in the air stream, a separator mechanism selectively to divert the cotton particles from the air stream comprising a frame, a plurality of filters supported therein and disposed in series at spaced intervals in said stream, each of said filters having a transversely disposed support bar secured to the frame and a plurality of elongated members individually pivotally depending from said support bar and transversely spaced at predetermined intervals to permit passage therethrough of the particles of said foreign material while diverting downwardly the particles of cotton wherein the intervals of spacing of the elongated members in the upstream filter are greater than the mean diameter of the cotton particles and the intervals of spacing of the elongated members of each successive filter downstream from said upstream filter are progressively diminished to a dimension less than said mean diameter but greater than the particle size of said foreign material.

4. In combination with a pneumatic conveying system employing a stream of moving air as a transporting force to convey cotton particles of a predetermined mean diameter and particles of foreign material of a smaller size, both types of particles being entrained in the air stream, a separator mechanism selectively to divert the cotton particles from the air stream comprising a frame, a plurality of filters supported therein and disposed in series at spaced intervals in said stream, each of said filters having a transversely disposed support bar secured to the frame and a plurality of elongated members pivotally depending from said support bar and transversely spaced at predetermined intervals to permit passage therethrough of the particles of said foreign material while diverting downwardly the particles of cotton, wherein the intervals of spacing of said filters are progressively decreased in a downstream direction and the intervals of spacing of the elongated members in the upstream filter are greater than the mean diameter of the cotton particles and the intervals of spacing of the elongated members of each successive filter downstream from said upstream filter are progressively diminished to a dimension less than said mean diameter but greater than the particle size of said foreign material.

5. In a pneumatic conveying system for particles of cotton employing a moving air stream as a motivating vehicle, the air stream having entrained therein particles of foreign material of predetermined mean dimensions; a receptacle including an open frame; a duct secured to the receptacle, the duct confining the air stream to a direction of flow substantially horizontally and having a slight vertical component; a first slotted-type deflector mounted on the frame to deflect downwardly cotton particles entrained in the air stream, the deflector having transverse intervals of spacing greater than the mean dimensions of the foreign material; a plurality of transversely spaced rods pivotally supported on the frame and disposed downstream from said deflector, the rods being spaced transversely a predetermined distance; second and third slotted deflectors mounted on the frame in series with said first deflector; and second and third series of transversely spaced depending rods disposed downstream respectively in series with said second and third deflectors.

References Cited by the Examiner
UNITED STATES PATENTS

| | | | |
|---|---|---|---|
| 495,945 | 4/93 | McDonough | 209—394 |
| 1,380,413 | 6/21 | Poppenhusen | 302—59 |
| 1,417,052 | 5/22 | Gasteiger | 302—59 |
| 2,772,445 | 12/56 | Hubbard | 209—394 |
| 2,919,954 | 1/60 | Fergason | 302—59 |

SAMUEL F. COLEMAN, *Acting Primary Examiner.*
ANDRES H. NIELSEN, ERNEST A. FALLER, JR.,
*Examiners.*